Nov. 24, 1959   F. GODBILLE   2,913,999
VEHICLES HAVING DUAL WHEELS
Filed Nov. 20, 1957
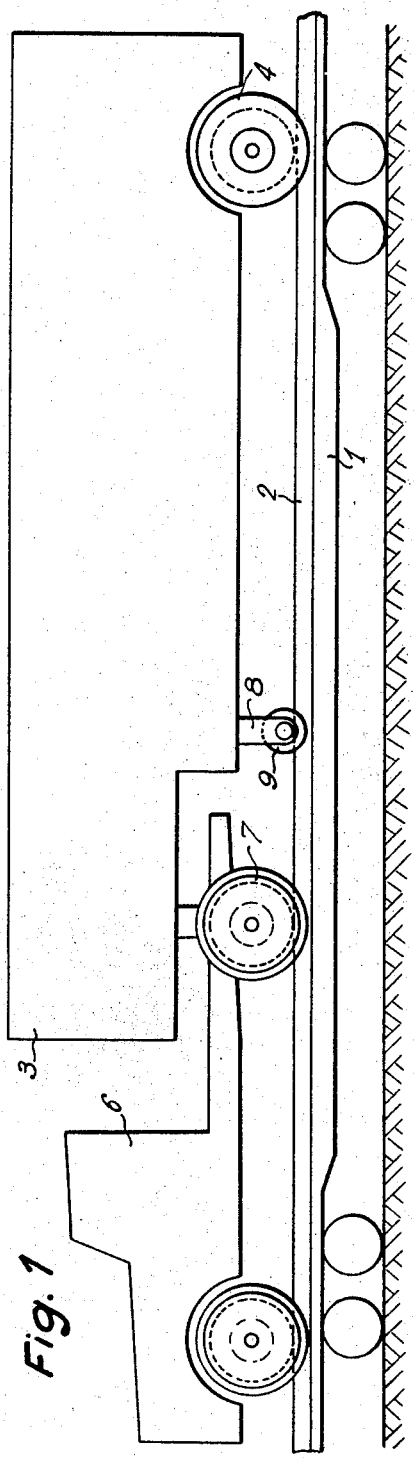
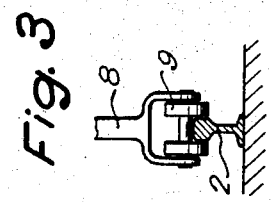
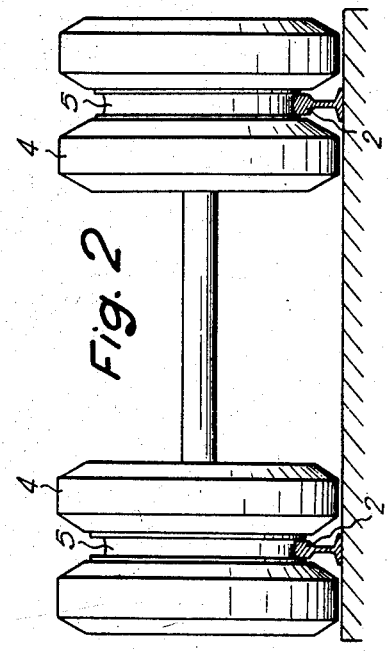

United States Patent Office 2,913,999
Patented Nov. 24, 1959

2,913,999

VEHICLES HAVING DUAL WHEELS

Francois Godbille, Paris, France, assignor to Société Anonyme dite: Fruehauf-France, Paris, France Application November 20, 1957, Serial No. 697,607

2 Claims. (Cl. 105—215)

This invention relates to vehicles provided with twin or dual wheels, and its broad object is to provide an improved construction for such vehicles whereby the loading of such vehicles on railroad cars will be facilitated. The invention more particularly relates to heavy-duty dual-wheel trailers and tractors although its teachings are applicable to other types of heavy-duty dual-wheel vehicles.

In loading a heavy-duty trailer upon a flat-car the trailer must be backed on to the car in order to permit eventually driving away the tractor. Hence, some sort of cooperating guide means have to be provided on the flat-car and on the trailer, and preferably also on the tractor, to facilitate the loading operation. In one known type of guiding arrangement, rollers are provided on the trailer outboard of the outermost wheels thereof and coaxially with said wheels, for cooperation with rails projecting from the railroad car platform. Such an arrangement has a serious drawback in that it requires a substantial reduction in the wheel-base or gauge width of the trailer or other vehicle. In another known system, rollers are provided inboard of the dual wheels of the trailer, journalled on horizontal axes positioned vertically below the wheel axle in such a manner as to relieve the load on the wheels when said rollers engage guide rails or bars projecting from the railroad car, the weight of the trailer being then transmitted to the car structure entirely through such rollers. Because of this fact the guide rollers must be made of an excessively large, heavyweight construction and the resulting system is cumbersome and uneconomical.

Objects of this invention are to provide an improved guide system for use in loading vehicles of the type described upon a platform such as a railroad flat-car; to provide such a system wherein the components mounted on the vehicle itself will leave the wheel-base thereof unaltered and stability unimpaired; to provide such a guide system which will provide a guiding action of improved efficiency while being more simple and economical to construct and mount on the vehicle than comparable guiding systems of known types. Further objects and advantages of the invention will appear as the disclosure proceeds.

According to an important feature of the invention, the principal guiding elements provided on a dual-wheel vehicle are provided in the form of spacer rims interposed between the twin wheels of each dual pair, and having rim surfaces coaxial with said wheels and adapted to engage a pair of cooperating guide rails or the like, provided in correspondingly spaced relationship upon the platform, such as that of a flat-car, to and over which the vehicle is to be guided.

In the final stationary condition of the vehicle upon the platform, the weight of the vehicle may be borne entirely by said rims. With the arrangement of the invention, the rims may readily be dimensioned to provide the requisite strength without materially adding to the weight, complication and cost of the vehicle as would be the case with separately journalled rollers of the kind mentioned hereinabove.

In the case of a tractor-trailer combination, the steerable wheels of the tractor, which is generally fitted with single rather than dual wheels, should be spaced such that the overall transverse dimension thereof will be somewhat less than the rail spacing. The drive wheels of the tractor are preferably provided according to the invention with coaxial rim surfaces adapted to engage the guide rails during a loading operation.

According to a further feature of the invention, applicable to semi-trailer-type vehicles wherein retractable props are provided for stabilizing the trailer on disconnection thereof from the tractor, suitable roller or similar means may be provided on the lower ends of said props for engagement with the guide rails when the trailer has been positioned upon the platform.

While the increased spacing between the tires in each dual wheel pair, as required by the invention, may be found troublesome in some cases, the attendant drawbacks may readily be overcome by providing pivoted wheel axles of any appropriate type.

An exemplary embodiment of the invention will now be described by way of illustration but not of limitation with reference to the accompanying diagrammatic drawings, wherein:

Figure 1 is a side elevational view of a tractor-trailer combination positioned upon a flat car;

Figure 2 is an end view of the invention, on an enlarged scale;

Figure 3 is a similar fragmentary view illustrating a prop provided with roller means according to the invention in engagement with a guide rail.

As shown, a flat car 1 is fitted with a pair of longitudinally extending guide rails 2 on it, preferably extending the full length of it. A heavy duty trailer is depicted in outline at 3, as having pairs of dual wheels 4 near its rear end. As shown in Figure 2, a spacer element 5 is interposed between the wheels of each dual pair, the elements 5 having peripheral surfaces or rims of suitable width and contour to engage with the beads of the respective rails 2. The spacing between the rails on the car platform is of course predetermined so as to correspond with the spacing between the elements 5.

A tractor 6 is shown in outline as having two pairs of wheels 7. Associated with the rear wheels 7 on each side of the tractor is a guide rim element similar to the element 5, as indicated in dotted lines in Figure 1. In case the tractor wheels 7 are single, rather than dual, the corresponding guide rims would be provided outboard of said wheels 7.

Illustrated at 8 is one of a pair of retractible props (only one of which is shown), each positioned generally in a common longitudinal plane of the trailer chassis with a corresponding one of the guide rims 5, so as to overlie a corresponding rail 2. Each prop 8 is formed at its lower end with a fork portion in which a respective flanged roller 9 is journalled, for engagement with the corresponding rail bead in the extended position of the prop.

In order to load the trailer, the tractor 6 is backed on to the initial or end flat-car of a train from a station platform. Any conventional pre-guiding arrangement (not shown) may be provided for assisting the driver in presenting the rear wheels of the trailer into register with the guide rails 2 on the flat-car, so as to engage the guide rims with said rails. After such engagement has been effected the tires 4 are relieved of the vehicle load and the said load is transmitted to the flat-car structure by way of the guide rims.

The guide rims secured on the rear wheel axles of the tractor then similarly engage with the rails 2, whereupon the tractor-trailer combination can be safely driven at relatively high speed in reverse over any desired number of interconnected flat-cars such as 1. On having reached the desired final postion the retractible props 8 are lowered so that the rollers 9 in turn engage the rails, thereby ensuring longitudinal and lateral stability of the trailer. The trailer can then be secured in place by any suitable means, preferably of a quick-acting nature, such as pivoted hook arms, adjustable shims or blocks, turnbuckle chains, or the like.

It will be understood that the invention is not to be considered as limited by the single form of embodiment thereof illustrated and described hereinabove for exemplary purposes, since the components of the improved guiding system may assume any of various forms that will appear readily to those familiar with the art, and the invention may be used to advantage in connection with vehicles other than those specifically mentioned and shown, and in connection with loading surfaces other than railroad cars.

I claim:

1. In a vehicle of the roadway type having a tractor and a trailer; the combination of laterally spaced drive wheels on said tractor, laterally spaced pairs of twin wheels on said trailer, said drive wheels and trailer wheels being of a type adapted for roadway travel, laterally spaced props on said trailer at locations which are longitudinally spaced from said twin wheels, first flanged guide rims supported coaxially with said tractor drive wheels, a second flanged guide rim supported coaxially with each pair of trailer wheels intermediate the wheels of each pair, said first and second guide rims being radially inset by equal distances with respect to the peripheries of the related drive and trailer wheels, and flanged roller means rotatably carried by said props and being peripherally tangent, at the bottom thereof, to a plane which is tangent to said first and second guide rims at the bottom of the latter, both said first and second guide rims and said roller means being equally spaced laterally so as to be adapted for simultaneous rolling engagement with a pair of guide support rails provided on a horizontal surface separate from the vehicle and extending above said horizontal surface by a distance greater than the radial distance between the peripheries of said drive and trailer wheels and of said first and second guide rims.

2. In a vehicle of the roadway type having a tractor and a trailer; the combination of laterally spaced drive wheels on said tractor, two laterally spaced pairs of twin wheels on said trailer, said tractor drive wheels and said trailer wheels being of a type adapted for roadway travel, laterally spaced retractible props on said trailer at locations which are longitudinally spaced from said twin wheels, first flanged guide support rims supported coaxially with said tractor drive wheels, a second flanged guide support rim supported coaxially with each pair of trailer wheels intermediate the wheels of each pair, said first and second guide rims being radially inset by equal distances with respect to the peripheries of the related drive and trailer wheels, and flanged roller means rotatably carried by said props and diametrically dimensioned so as to be peripherally tangent, at the bottom of said roller means, to a plane tangent to said first and second guide rims, at the bottom of the latter, when said props are in an extended position thereof, both said first and second guide support rims and said roller means being equally spaced laterally so as to be adapted for simultaneous rolling engagement with a pair of guide support rails provided on a horizontal surface separate from the vehicle and extending above said horizontal surface by a distance greater than the radial distance between the peripheries of said drive and trailer wheels and of said first and second guide rims.

References Cited in the file of this patent

UNITED STATES PATENTS

| | | |
|---|---|---|
| 1,816,820 | Bartlett | Aug. 4, 1931 |
| 2,099,288 | Allen | Nov. 16, 1937 |
| 2,135,307 | Keator | Nov. 1, 1938 |
| 2,541,514 | Herold | Feb. 13, 1951 |

OTHER REFERENCES

Publication, "Railway Age" magazine, issue of Nov. 11, 1957, page 47.